(12) United States Patent
Motojima (10) Patent No.: US 6,862,328 B2
(45) Date of Patent: Mar. 1, 2005

(54) SYNCHRONIZING PATTERN POSITION DETECTION CIRCUIT

(75) Inventor: Katsuo Motojima, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 875 days.

(21) Appl. No.: 09/817,312

(22) Filed: Mar. 27, 2001

(65) Prior Publication Data

US 2002/0006176 A1 Jan. 17, 2002

(30) Foreign Application Priority Data

Jul. 11, 2000 (JP) .................................. 2000-209145

(51) Int. Cl.⁷ .............................................. H04L 7/00
(52) U.S. Cl. ..................... 375/368; 375/365; 370/514
(58) Field of Search .......................... 375/365, 366, 375/367, 368; 370/513–515, 509; 380/204, 224

(56) References Cited

U.S. PATENT DOCUMENTS

| | | | | |
|---|---|---|---|---|
| 5,123,013 A | * | 6/1992 | Hirayama | ................. 370/389 |
| 5,140,618 A | * | 8/1992 | Kinoshita et al. | ........... 375/368 |
| 6,005,839 A | * | 12/1999 | Sako et al. | ............... 369/275.3 |
| 6,567,424 B1 | * | 5/2003 | Girardeau, Jr. | ............. 370/509 |

FOREIGN PATENT DOCUMENTS

| | | |
|---|---|---|
| JP | A-2-126730 | 5/1990 |
| JP | A-2000-10761 | 1/2000 |

* cited by examiner

*Primary Examiner*—Phuong Phu
(74) *Attorney, Agent, or Firm*—Arent Fox PLLC (57) ABSTRACT

Selector circuits are connected in a hierarchical arrangement. Each of the selector receives two of synchronizing pattern detection signals and two of synchronizing pattern position signals and selects one of the received synchronizing pattern position signals in accordance with values of the received synchronizing pattern detection signals, so that the position of a synchronizing pattern on parallel data can be identified in a tournament fashion.

7 Claims, 6 Drawing Sheets

SYNCHRONIZING PATTERN POSITION DETECTION CIRCUIT

BACKGROUND OF THE INVENTION

1. Field of the Invention

The present invention generally relates to a synchronizing pattern position detection circuit that detects the position of a synchronizing pattern on parallel data obtained by a serial-to-parallel conversion of serial data transmitted in a frame unit.

Serial data transmitted on the frame basis may be converted into parallel data having a given bit width. If the serial-to-parallel conversion does not make reference to the head of the frame, it is required to detect, on parallel data, the position of a synchronizing pattern located in the head of the frame in order to know the position of the beginning bit of the frame on the parallel data.

2. Description of the Related Art

A conventional synchronizing pattern position detection circuit equipped with a priority encode circuit is known. The priority encode circuit masks a synchronizing pattern detection signal having priority lower than that of another synchronizing pattern detection signal indicative of a synchronizing pattern detection value.

The above priority encode circuit needs a plurality of stages of gate circuits as many as the bits of parallel data in order to mask the synchronizing pattern detection signal having priority lower than that of the synchronizing pattern indicating the synchronizing pattern detection circuit. This would result in an increased delay of time, which would prevent high-speed detection of the target synchronizing pattern on the parallel data.

SUMMARY OF THE INVENTION

It is a general object of the present invention to provide a synchronizing pattern position detection circuit in which the above disadvantage is eliminated.

A more specific object of the present invention is to provide a synchronizing pattern position detection circuit capable of detecting the position of a synchronizing pattern on parallel data obtained by a serial-to-parallel conversion of serial data transmitted in the frame unit.

The above objects of the present invention are achieved by a synchronizing pattern position detection circuit comprising: a plurality of selector circuits connected in a hierarchical arrangement. Each of the selector receives two of synchronizing pattern detection signals and two of synchronizing pattern position signals and selects one of the two of synchronizing pattern detection signals and one of the two of synchronizing pattern position signals. One of the selector circuits located at an uppermost stage of the hierarchical arrangement outputs a finally selected one of the synchronizing pattern detection signals and a finally selected one of the synchronizing pattern position signals. The synchronizing pattern signals are included in serial data. The synchronizing pattern position signals indicate positions of the synchronizing pattern signals on parallel data obtained by a serial-to-parallel conversion of the serial data.

The above objects of the present invention are also achieved by a synchronizing pattern position detection circuit receiving synchronizing pattern detection signals and synchronizing pattern position signals indicating positions of the synchronizing pattern detection signals in parallel and detecting a position of a synchronizing pattern on parallel data. The synchronizing pattern position detection circuit includes selector circuits connected in a hierarchical arrangement. Each of the selector circuits includes first and second input parts for receiving synchronizing pattern detection signals, and third and fourth input parts for receiving synchronizing pattern position signals. Each of the selector circuits selectively outputs: a synchronizing pattern position signal applied to the third input part when only a synchronizing pattern detection signal applied to the first input part indicates a given detection value or the synchronizing pattern detection signals applied to the first and second input parts indicate the given detection value; a synchronizing pattern position signal applied to the fourth input part when only a synchronizing pattern detection signal applied to the second input part indicates the given detection value; and a synchronizing signal detection signal obtained by performing an OR operation on the synchronizing pattern detection signals applied to the first and second input parts.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given of a first embodiment of the present invention.

Figure 1:
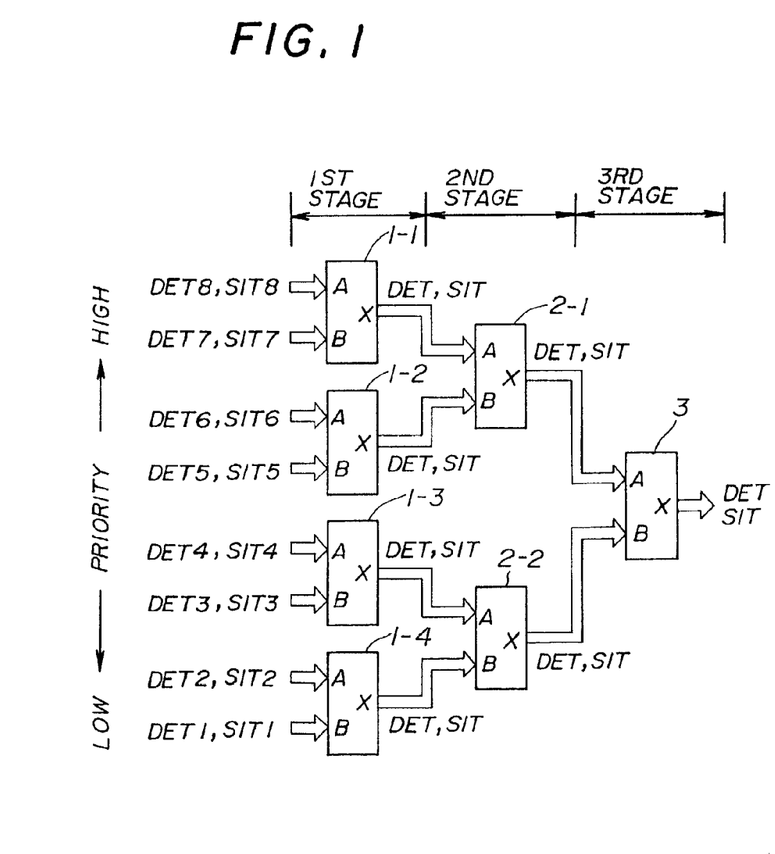
FIG. 1 is a block circuit of a first embodiment of the present invention.

FIG. 1 is a block diagram of a synchronizing pattern position detection circuit according to the first embodiment of the present invention. The circuit shown in FIG. 1 converts serial data transmitted in a frame unit having a data length of 8×n bits (n is an integer) into parallel data having a width of eight bits.

Symbols DET8-DET1 respectively denote synchronizing pattern detection signals each consisting of one bit. These detection signals are output by a synchronizing pattern detection circuit, which is not shown for the sake of simplicity. The synchronizing pattern detection signal DETy indicates whether the yth bit ($2^{y-1}$) of the eight-bit width of the eight-bit parallel data forms the beginning bit of a synchronizing pattern located in the head of the frame (the beginning bit of the frame).

A portion of information bits in the frame may include arbitrary data. Therefore, there is a possibility that a pattern identical to the synchronizing pattern may be included in the portion of information bits. Thus, the synchronizing pattern detection signal DETy responds to not only the synchronizing pattern but also a synchronizing pattern contained in the information bits.

The first embodiment of the present invention assumes the following. The synchronizing pattern detection signal DETy equal to 1 (DETy="1") indicates that the yth bit of the eight-bit width of the eight-bit parallel data forms the beginning bit of the synchronizing pattern or the beginning bit of the same pattern as the synchronizing pattern. In contrast, the synchronizing pattern detection signal DETy equal to 0 (DETy="0") indicates that the yth bit of the eight-bit width of the eight-bit parallel data does not form the beginning bit of the synchronizing pattern or the beginning bit of the same pattern as the synchronizing pattern.

Symbols SIT8-SIT1 respectively denote three-bit synchronizing pattern position signals that indicate the positions of the synchronizing pattern detection signals DET8-DET1 in the eight-bit width of the eight-bit parallel data, and assume the following values: SIT8=000, SIT7=001, SIT6=110, SIT5=011, SIT4=100, SIT3=101, SIT2=110 and SIT1=111.

The circuit shown in FIG. 1 includes selector circuits 1-1 through 1-4, 2-1 and 2-2, which are hierarchically connected. Each of the selector circuits 1-1 through 1-4, 2-1 and 2-2 has a first input terminal group (third input part) A, a second input terminal group (fourth input part) B, and an output terminal group X. The selector circuits 1-1 through 1-4 are located at the lowermost stage of the hierarchical arrangement, and the selector 3 is located at the uppermost stage thereof.

Figure 2:
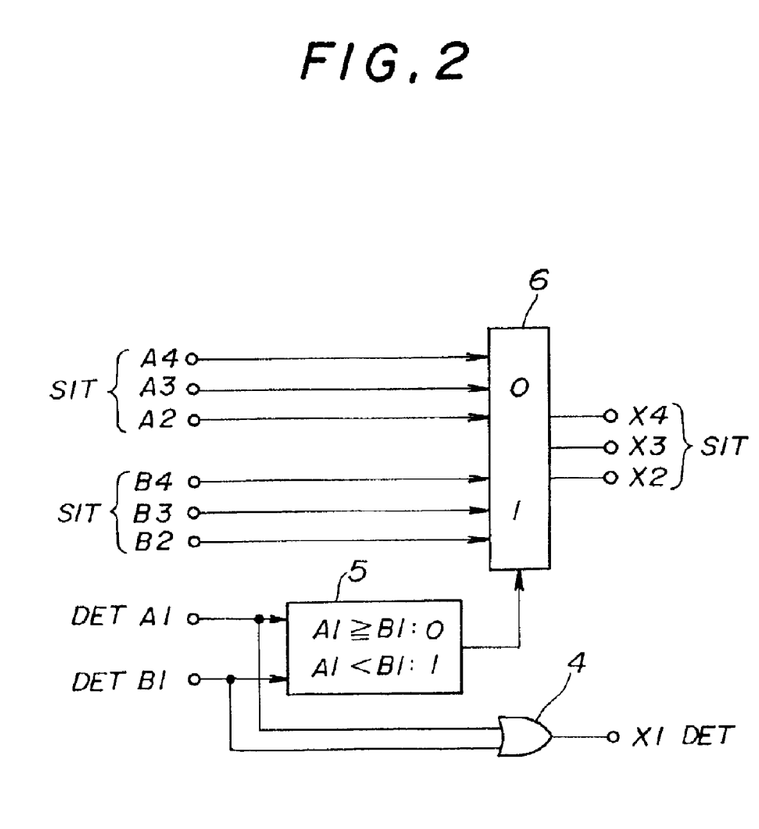
FIG. 2 is a block diagram of selector circuits used in the first embodiment of the present invention.

FIG. 2 is a block diagram of each of the selector circuits 1-1 through 1-4, 2-1 and 2-2. Symbols A1–A4 denote input terminals of the first input terminal group A. The input terminal (first input part) A1 receives the synchronizing pattern detection signal. The input terminals A2–A4 receive the synchronizing pattern position signal. Symbols B1–B4 denote input terminals of the second input terminal group B. The input terminal (second input part) B1 receives the synchronizing pattern detection signal. The input terminals B2–B4 receive the synchronizing pattern position signal. Symbols X1–X4 denote output terminals of the output terminal group X. The synchronizing pattern detection signal is output via the output terminal X1, and the synchronizing pattern position signal is output via the output terminals X2–X4.

There is also provided an OR circuit 4, which executes an OR operation on the synchronizing pattern detection signal DET applied to the input terminal A1 and the synchronizing pattern detection signal DET applied to the input terminal B1.

Further, the selector circuit shown in FIG. 2 includes a comparator circuit 5, which compares the synchronizing pattern detection signal DET applied to the input terminal A1 with the synchronizing pattern detection signal DET applied to the input terminal B1. The comparator circuit 5 outputs "0" in any of the following first through third cases. In the first case, the synchronizing pattern detection signals DET applied to the input terminals A1 and B1 are respectively equal to "1" and "0". In the second case, the synchronizing pattern detection signals DET applied to the input terminals A1 and B1 are both equal to "1". In the third case, the synchronizing pattern detection signals DET applied to the input terminals A1 and B1 are both equal to "0". In contrast, the comparator circuit 5 outputs "1" when the synchronizing pattern detection signals DET applied to the input terminals A1 and B1 are respectively equal to "0" and "1".

The comparator circuit may be configured so as to output "1" when the synchronizing pattern detection signals DET applied to the input terminals A1 and B1 are both equal to "0".

The selector circuit shown in FIG. 2 includes a selector 6, which is controlled by the output of the comparator circuit 5. The selector 6 selects either the synchronizing pattern position signal SIT applied to the input terminals A2-A4 or the synchronizing pattern position signal SIT applied to the input terminals B2–B4. When the output of the comparator circuit 5 indicates "0", the selector 6 selects the synchronizing pattern position signal SIT applied to the input terminals A2–A4. When the output of the comparator circuit 5 indicates "1", the selector 6 selects the synchronizing pattern position signal SIT applied to the input terminals B2–B4.

In each of the selector circuits 1-1 through 1-4, 2-1 and 2-2 as configured above, the synchronizing pattern position signal SIT applied to the input terminals A2–A4 is selected in any of the above-mentioned first through third cases. In contrast, each selector selects the synchronizing pattern position signal SIT applied to the input terminals B2–B4 when the synchronizing pattern detection signals DET applied to the input terminals A1 and B1 are respectively equal to "0" and "1".

Figure 3:
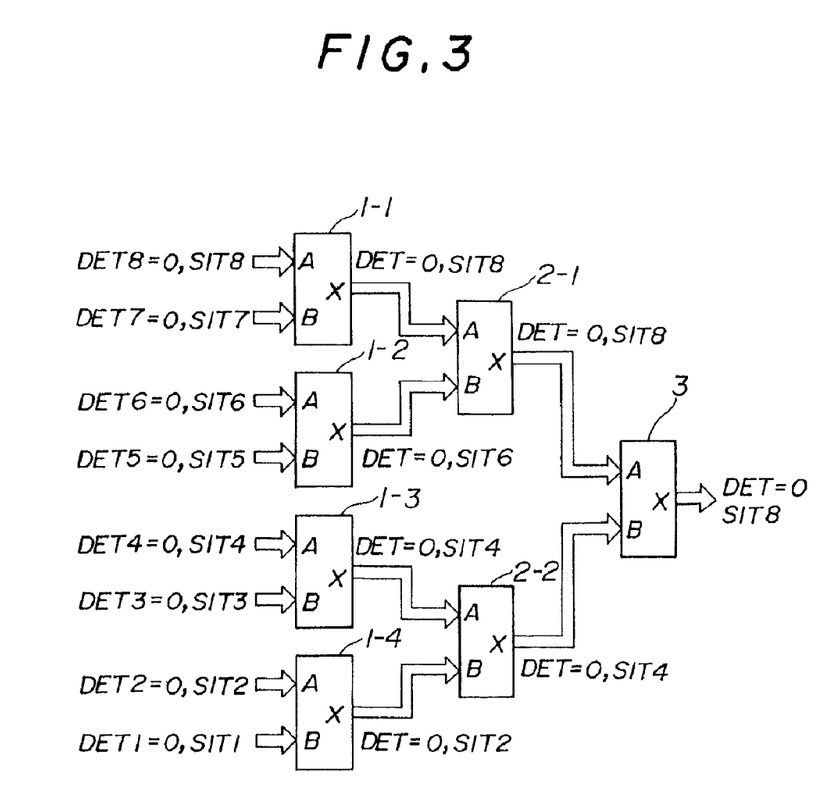
FIG. 3 is a block diagram illustrating the operation of the first embodiment of the present invention.

Thus, for example, for DET8-DET1="0" as shown in FIG. 3, the selector circuits operate as follows. The synchronizing pattern detection signal DET from the selector circuit 1-1 is equal to "0", and the synchronizing pattern position signal SIT output therefrom is equal to SIT8 (SIT=SIT8). The synchronizing pattern detection signal DET from the selector circuit 1-2 is equal to "0", and the synchronizing pattern position signal SIT output therefrom is equal to SIT6 (SIT=SIT6). The synchronizing pattern detection signal DET from the selector circuit 1-3 is equal to "0", and the synchronizing pattern position signal SIT output therefrom is equal to SIT4 (SIT=SIT4). The synchronizing pattern detection signal DET from the selector circuit 1-4 is equal to "0", and the synchronizing pattern position signal SIT output therefrom is equal to SIT2 (SIT=SIT2).

Further, the synchronizing pattern detection signal DET from the selector circuit 2-1 is equal to "0", and the synchronizing pattern position signal SIT output therefrom is equal to SIT8 (SIT=SIT8). The synchronizing pattern detection signal DET from the selector circuit 2-2 is equal to "0", and the synchronizing pattern position signal SIT output therefrom is equal to SIT4 (SIT=SIT4). The synchronizing pattern detection signal DET from the selector circuit 3 is equal to "0" and the synchronizing pattern position signal SIT is equal to SIT8. Since the synchronizing pattern detection signal DET from the selector circuit 3 is equal to "0", it can be determined that the synchronizing pattern is not detected.

Figure 4:
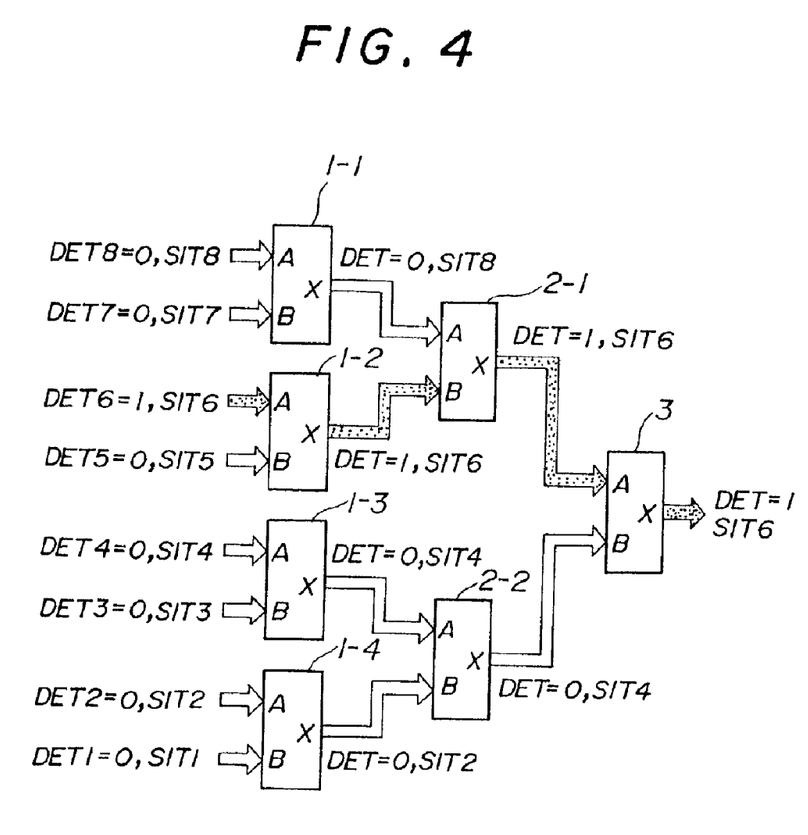
FIG. 4 is another block diagram illustrating the operation of the first embodiment of the present invention.

As shown in FIG. 4, for DET8-DET7="0", DET6="1", DET5-DET1="0", the selector circuits operate as follows. The synchronizing pattern detection signal DET from the selector circuit 1-1 is equal to "0", and the synchronizing pattern position signal SIT output therefrom is equal to SIT8 (SIT=SIT8). The synchronizing pattern detection signal DET from the selector circuit 1-2 is equal to "1", and the synchronizing pattern position signal SIT output therefrom is equal to SIT6 (SIT=SIT6). The synchronizing pattern detection signal DET from the selector circuit 1-3 is equal to "0", and the synchronizing pattern position signal SIT output therefrom is equal to SIT4 (SIT=SIT4). The synchronizing pattern detection signal DET from the selector circuit 1-4 is equal to "0", and the synchronizing pattern position signal SIT output therefrom is equal to SIT2 (SIT=SIT2).

Further, the synchronizing pattern detection signal DET from the selector circuit 2-1 is equal to "1", and the synchronizing pattern position signal SIT output therefrom is equal to SIT6 (SIT=SIT6). The synchronizing pattern detection signal DET from the selector circuit 2-2 is equal to "0", and the synchronizing pattern position signal SIT output therefrom is equal to SIT4 (SIT=SIT4). The synchronizing pattern detection signal DET from the selector circuit 3 is equal to "1", and the synchronizing pattern position signal SIT output therefrom is equal to SIT6. Therefore, it can be seen from the above that the beginning bit of the synchronizing pattern or the beginning bit of the same pattern as the synchronizing pattern is located in the sixth bit of the eight-bit width of the eighth-bit parallel data.

If an event such that the synchronizing pattern detection signal DET output by the selector circuit 3 is "1" and the synchronizing pattern position signal SIT is equal to SIT6 is repeatedly obtained with a given constant period, it can be judged that the beginning bit of the synchronizing pattern is located at the sixth bit of the eight-bit width of the eight-bit parallel data.

In contrast, if the event that the synchronizing pattern detection signal DET output by the selector circuit 3 is "1" and the synchronizing pattern position signal SIT is equal to SIT6 is not repeatedly obtained with a given constant period, it can be judged that the same pattern as the synchronizing pattern in the information bits has been detected.

Figure 5:
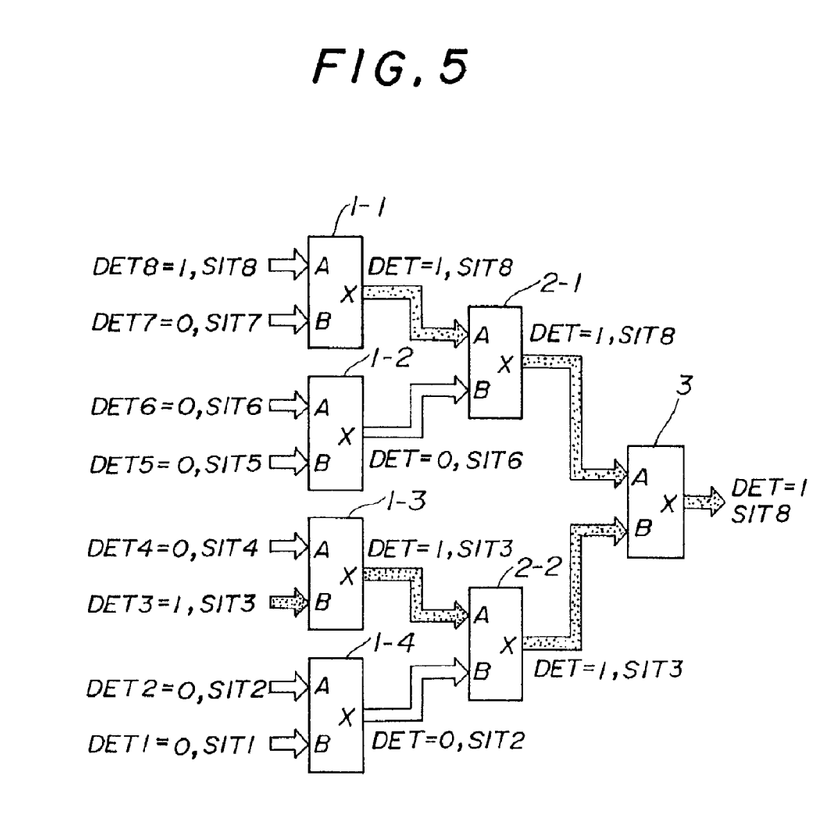
FIG. 5 is yet another block diagram illustrating the operation of the first embodiment of the present invention.

As shown in FIG. 5, for DET8="1", DET7–DET4="0", DET3="1", DET2–DET1="0", the selector circuits operate as follows. The synchronizing pattern detection signal DET from the selector circuit 1-1 is equal to "1", and the synchronizing pattern position signal SIT output therefrom is equal to SIT8 (SIT=SIT8). The synchronizing pattern detection signal DET from the selector circuit 1-2 is equal to "0", and the synchronizing pattern position signal SIT output therefrom is equal to SIT6 (SIT=SIT6). The synchronizing pattern detection signal DET from the selector circuit 1-3 is equal to "1", and the synchronizing pattern position signal SIT output therefrom is equal to SIT3 (SIT=SIT3). The synchronizing pattern detection signal DET from the selector circuit 1-4 is equal to "0", and the synchronizing pattern position signal SIT output therefrom is equal to SIT2 (SIT=SIT2).

Further, the synchronizing pattern detection signal DET from the selector circuit 2-1 is equal to "1", and the synchronizing pattern position signal SIT output therefrom is equal to SIT8 (SIT=SIT8). The synchronizing pattern detection signal DET from the selector circuit 2-2 is equal to "1", and the synchronizing pattern position signal SIT output therefrom is equal to SIT3 (SIT=SIT3). The synchronizing pattern detection signal DET from the selector circuit 3 is equal to "1" and the synchronizing pattern position signal SIT output therefrom is equal to SIT8. Therefore, it can be seen from the above that the beginning bit of the synchronizing pattern or the beginning bit of the same pattern as the synchronizing pattern is located in the eighth bit of the eight-bit width of the eighth-bit parallel data.

If an event such that the synchronizing pattern detection signal DET output by the selector circuit 3 is "1" and the synchronizing pattern position signal SIT is equal to SIT8 is repeatedly obtained with a given constant period, it can be judged that the beginning bit of the synchronizing pattern is located at the eighth bit of the eight-bit width of the eight-bit parallel data.

In contrast, if the event that the synchronizing pattern detection signal DET output by the selector circuit 3 is "1" and the synchronizing pattern position signal SIT is equal to SIT8 is not repeatedly obtained with a given constant period, it can be judged that the same pattern as the synchronizing pattern in the information bits has been detected.

The priority of detection of the synchronizing pattern is such that DET8>DET7> . . . >DET2>DET1 because of the performance of the selector circuits 1-1 through 1-4, 2-1, 2-2 and 3. If no priority of detection of the synchronizing pattern is assigned, the synchronizing pattern cannot be detected if a plurality of synchronizing pattern position signals are equal to "1" (synchronizing pattern detection value).

According to the first embodiment of the present invention, the three-stage hierarchical arrangement of the selector circuits 1-1–1-4, 2-1, 2-2 and 3 makes it possible to select, in a tournament fashion, one of the synchronizing pattern detection signals each indicating the synchronizing pattern detection value ("1") and the corresponding one of the synchronizing pattern position signals when serial data transmitted in the frame unit having a data length of 8×n bits is converted into eight-bit-width parallel data. Therefore, the synchronizing pattern on eight-bit parallel-data can be detected at a high speed.

A description will be given, with reference to FIG. 6, of a synchronizing pattern position detection circuit according to a second embodiment of the present invention. This detection circuit is used when serial data transmitted in a frame unit having a data length of 128×n bits is converted into parallel data having a 128-bit width.

Figure 6:
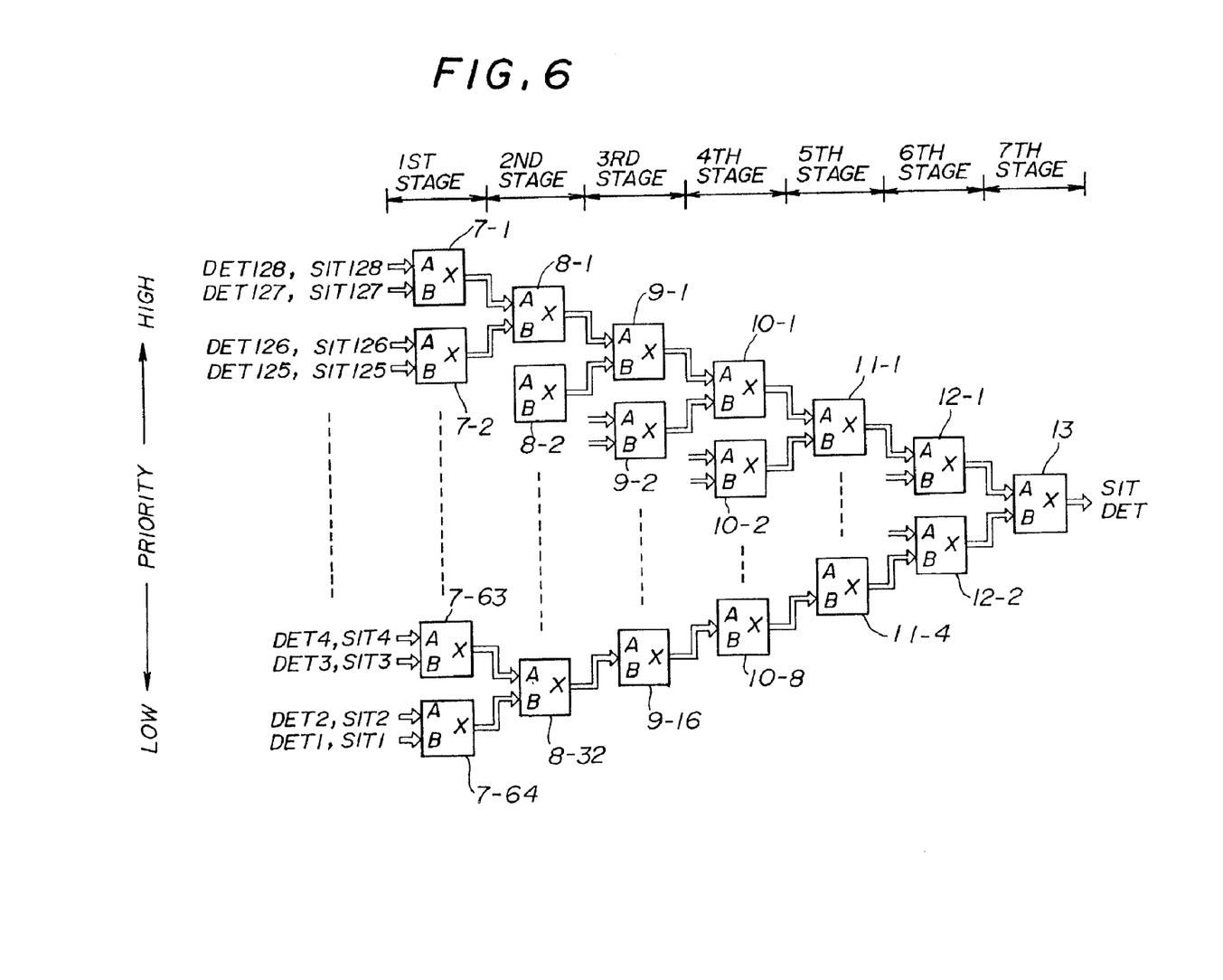
FIG. 6 is a block diagram of a second embodiment of the present invention.

Referring to FIG. 6, DET128-DET1 respectively denote a one-bit synchronizing pattern detection signal. SIT128-SIT1 respectively denote a 7-bit synchronizing pattern position signal that indicates the position of the synchronizing pattern detection signals DET128-DET1 in the 128-bit width of the 128-bit parallel data. The synchronizing pattern detection value of the synchronizing pattern detection signal DETz is "1".

The detection circuit shown in FIG. 6 includes selector circuits 7-1, 7-2, 7-63, 7-64, 8-1, 8-2, 8-32, 9-1, 9-2, 9-16, 10-1, 10-2, 10-8, 11-1, and 11-4, each having an identical structure as shown in FIG. 2. For the sake of simplicity, FIG. 6 is illustrated so as to omit selector circuits 7-3 through 7-62 interposed between the selector circuits 7-2 and 7-63, selector circuits 8-3 through 8-31 interposed between the selector circuits 8-2 and 8-32, selector circuits 9-3 through 9-15 interposed between the selector circuits 9-2 and 9-16, selector circuits 10-3 through 10-7 interposed between the selector circuits 10-2 and 10-8, and selector circuits 11-2 through 11-3 interposed between the selector circuits 11-1 and 11-4.

According to the second embodiment of the present invention, the seven-stage hierarchical arrangement of the selector circuits 7-1–7-64, 8-1–8-32, 9-1–9-16, 10-1–10-8, 11-1–11-4, 12-1, 12-2 and 13 makes it possible to select, in a tournament fashion, one of the synchronizing pattern detection signals each indicating the synchronizing pattern detection value ("1") and the corresponding one of the synchronizing pattern position signals when serial data transmitted in the frame unit having a data length of 128×n bits is converted into 128-bit-width parallel data. Therefore, the synchronizing pattern on 128-bit parallel data can be detected at a high speed.

According to the present invention, it is sufficient to use an m-stage hierarchical arrangement of $[2^{m-1}+2^{m-2}+ \ldots +1]$ (m is an integer equal to or greater than 2) selector circuits in order to convert serial data transmitted in a frame unit having a data length of $2^m \times n$ bits into parallel data of a $2^m$-bit width.

According to the present invention, a hierarchical arrangement of selector circuits selects one of the synchronizing pattern detection signals indicating the synchronizing pattern detection signal and a corresponding one of the synchronizing pattern position signals in a tournament fashion, which makes it possible to detect the synchronizing pattern on parallel data at high speed.

The present application is based on Japanese Priority Patent Application No. 2000-209145 filed on Jul. 11, 2000, the entire contents of which are hereby incorporated by reference.

What is claimed is:

1. A synchronizing pattern position detection circuit comprising:

a plurality of selector circuits connected in a hierarchical arrangement, each of the selector receiving two of synchronizing pattern detection signals and two of synchronizing pattern position signals and selecting one of the two of synchronizing pattern detection signals and one of the two of synchronizing pattern position signals, one of the selector circuits located at an uppermost stage of the hierarchical arrangement outputting a finally selected one of the synchronizing pattern detection signals and a finally selected one of the synchronizing pattern position signals, the synchronizing pattern signals being included in serial data, the synchronizing pattern position signals indicating positions of the synchronizing pattern signals on parallel data obtained by a serial-to-parallel conversion of the serial data.

2. The synchronizing pattern position detection circuit as claimed in claim 1, wherein the plurality of selector circuits in the hierarchical arrangement are $[2^{m-1}+2^{m-2}+ \ldots +1]$ (m is an integer equal to or greater than 2) selector circuits in a case where the serial data is transmitted in a frame unit having a data length of $2^m \times n$ bits and converted into parallel data of a $2^m$-bit width wherein n is an integer greater than zero.

3. The synchronizing pattern position detection circuit as claimed in claim 1, wherein the hierarchical arrangement has given priority assigned to the plurality of selector circuits.

4. The synchronizing pattern position detection signal as claimed in claim 1, wherein each of the selector circuits selects one of the two of synchronizing pattern position signals based on values of the two of synchronizing pattern detection signals.

5. The synchronizing pattern position detection signal as claimed in claim 1, wherein:

each of the selector circuits includes an OR circuit that performs an OR operation on the two of synchronizing pattern detection signals; and an output of the OR circuit corresponds to said one of the two of synchronizing pattern detection signals.

6. The synchronizing pattern position detection circuit as claimed in claim 1, wherein:

each of the selector circuits has a first input terminal group that receives one of the two of the synchronizing pattern position signals, and a second input terminal group that receives the other one of the two of the synchronizing pattern position signals;

each of the selector circuits selects either the first input terminal group or the second input terminal group in accordance with the two of the synchronizing pattern detection signals.

7. A synchronizing pattern position detection circuit receiving synchronizing pattern detection signals and synchronizing pattern position signals indicating positions of the synchronizing pattern detection signals in parallel and detecting a position of a synchronizing pattern on parallel data, said synchronizing pattern position detection circuit comprising:

selector circuits connected in a hierarchical arrangement, each of the selector circuits comprising first and second input parts for receiving synchronizing pattern detection signals, and third and fourth input parts for receiving synchronizing pattern position signals, each of the selector circuits selectively outputting:

a synchronizing pattern position signal applied to the third input part when only a synchronizing pattern detection signal applied to the first input part indicates a given detection value or the synchronizing pattern detection signals applied to the first and second input parts indicate the given detection value;

a synchronizing pattern position signal applied to the fourth input part when only a synchronizing pattern detection signal applied to the second input part indicates the given detection value; and a synchronizing signal detection signal obtained by performing an OR operation on the synchronizing pattern detection signals applied to the first and second input parts.

* * * * *